United States Patent
Laurent et al.

(10) Patent No.: US 7,169,077 B2
(45) Date of Patent: Jan. 30, 2007

(54) GEAR CHANGE METHOD FOR A TRACTION CHAIN COMPRISING A GEAR CHANGE MECHANISM FOR EACH DRIVING WHEEL

(75) Inventors: Daniel Laurent, Marly (CH); Pierre Varenne, Neyruz (CH); Pierre Alain Magne, Saint Aubin (CH)

(73) Assignee: Conception et Developpment Michelin S.A., Ch-Givisiez (CH)

( * ) Notice: Subject to any disclaimer, the term of this patent is extended or adjusted under 35 U.S.C. 154(b) by 270 days.

(21) Appl. No.: 10/875,779

(22) Filed: Jun. 25, 2004

(65) Prior Publication Data
US 2005/0028640 A1   Feb. 10, 2005

(30) Foreign Application Priority Data
Jul. 9, 2003   (FR) .................... 03 08391
Jul. 21, 2003  (FR) .................... 03 08890

(51) Int. Cl.
B60K 7/00 (2006.01)
(52) U.S. Cl. ...................... 477/15; 180/65.7
(58) Field of Classification Search ............ 477/15, 477/7, 3; 180/245, 65.5, 65.7
See application file for complete search history.

(56) References Cited

U.S. PATENT DOCUMENTS

| | | | |
|---|---|---|---|
| 2,939,344 A | 6/1960 | Harris | |
| 3,297,926 A * | 1/1967 | Campbell et al. | 318/138 |
| 4,505,368 A | 3/1985 | Ackermann et al. | |
| 4,593,580 A | 6/1986 | Schulze | |
| 5,498,216 A | 3/1996 | Bitsche et al. | |
| 5,688,205 A | 11/1997 | Bühler | |
| 5,741,202 A | 4/1998 | Huber | |
| 5,827,148 A * | 10/1998 | Seto et al. | 477/15 |
| 5,879,265 A | 3/1999 | Bek | |
| 6,590,306 B2 * | 7/2003 | Terada | 310/75 C |
| 2002/0023791 A1 | 2/2002 | Kima et al. | |
| 2004/0007406 A1 | 1/2004 | Laurent et al. | |
| 2004/0200648 A1 * | 10/2004 | Tarasinski et al. | 180/65.7 |
| 2005/0236198 A1 * | 10/2005 | Jenkins | 180/65.5 |

* cited by examiner

Primary Examiner—Sherry Estremsky
(74) Attorney, Agent, or Firm—Buchanan Ingersoll & Rooney PC (57) ABSTRACT

A vehicle has at least two driving wheels, each driven by an electric motor M via a gear change mechanism having at least two reduction gears. A sensor senses the rotation speed of the driving wheels. The gear change on the two driving wheels is carried out in an initial phase by: (a) releasing the current gear on a driving wheel referred to as the "operated" wheel, and stopping it in the neutral position, (b) changing the revolution speed of the motor so as to synchronize it as a function of the reduction of the gear to be engaged on the operated wheel, using as an estimate of the speed to-be-reached a speed information item obtained from another driving wheel, referred to as the "sensor" wheel, and (c) engaging the intended gear on the "operated" wheel. Then, in a successive phase, the gear on the other driving wheel is changed in the same manner by reversing the roles of the sensor wheel and the operated wheel.

13 Claims, 13 Drawing Sheets

GEAR CHANGE METHOD FOR A TRACTION CHAIN COMPRISING A GEAR CHANGE MECHANISM FOR EACH DRIVING WHEEL

BACKGROUND OF THE INVENTION

The present invention relates to electric traction motor vehicles having a traction motor in each of the driving wheel. It can be used both on purely electric vehicles and on vehicles of the series hybrid type.

In some of the cases mentioned above, it is considered desirable to have a choice of reduction gears between the electric motor and the wheel. The traction chain therefore comprises a gear change mechanism which makes it possible either to obtain a high torque on the wheel or to reach the maximum speed of the vehicle. The problem then arises of how to carry out the gear change in a manner that is as gentle and imperceptible as possible. In this respect, reference can be made to the following publications: U.S. Pat. Nos. 5,879,265, 5,498,216, 4,593,580, 5,688,205, 5,741,202, 4,505,368 et U.S. 2002/0023791.

However, all these devices need complex or costly means to ensure a ratio change as gently as possible.

The aim of the invention is to control the gear change on the driving wheels by using as far as possible means that are integrated with other functions so as to avoid any pointless complexity and source of failure.

SUMMARY OF THE INVENTION

The invention proposes a method of controlling the gear change for a vehicle having at least two driving wheels, each equipped with a traction chain comprising an electric motor which drives an input shaft, a gear change mechanism having at least two reduction gears with a neutral position between gears, in which the gear change on the two driving wheels is carried out by offsetting over time the gear changes on the two driving wheels in accordance with the following sequence: in an initial phase,
   releasing the current gear on a wheel referred to as the "operated" wheel, and stopping it in the neutral position,
   changing the revolution speed of the electric motor so as to synchronize it as a function of the reduction of the gear to be engaged on the operated wheel, using as an estimate of the speed to be reached a speed information item that is obtained from another driving wheel, referred to as the "sensor" wheel,
   engaging the intended gear on said "operated" wheel,
then, in a successive phase, changing the gear on said other driving wheel.

Preferably, the gear change on said other driving wheel is carried out in a similar manner, using as an estimate of the speed to be reached a speed information item that is obtained from the driving wheel on which the reduction gear has just been changed. This therefore involves, from the operation of changing the gear on a first driving wheel (initial phase) to the operation of changing the gear on a second driving wheel (successive phase), reversing the roles of sensor wheel and operated wheel. In other words, the location of the "sensor" wheel and of the "operated" wheel is reversed between the initial phase and the successive phase.

In one particular and non-limiting embodiment described below, the invention uses a gear change mechanism that is integrated on the wheel, the mechanism comprising a dog that makes it possible to select one or the other of the gears. Moreover and preferably, use is made of brushless permanent magnet synchronous electric motors (commonly referred to by the abbreviated name PMSM for Permanent Magnet Synchronous Motor) which, by nature, comprise a rotor position sensor. The invention uses only this rotor position sensor of the motor and a sensor assembly associated with the gear change mechanism to determine the rotation speed of the wheel in question and make all the necessary gear changes. Preferably, the arrangement comprises only two gears.

DETAILED DESCRIPTION OF THE INVENTION

Figure 1:
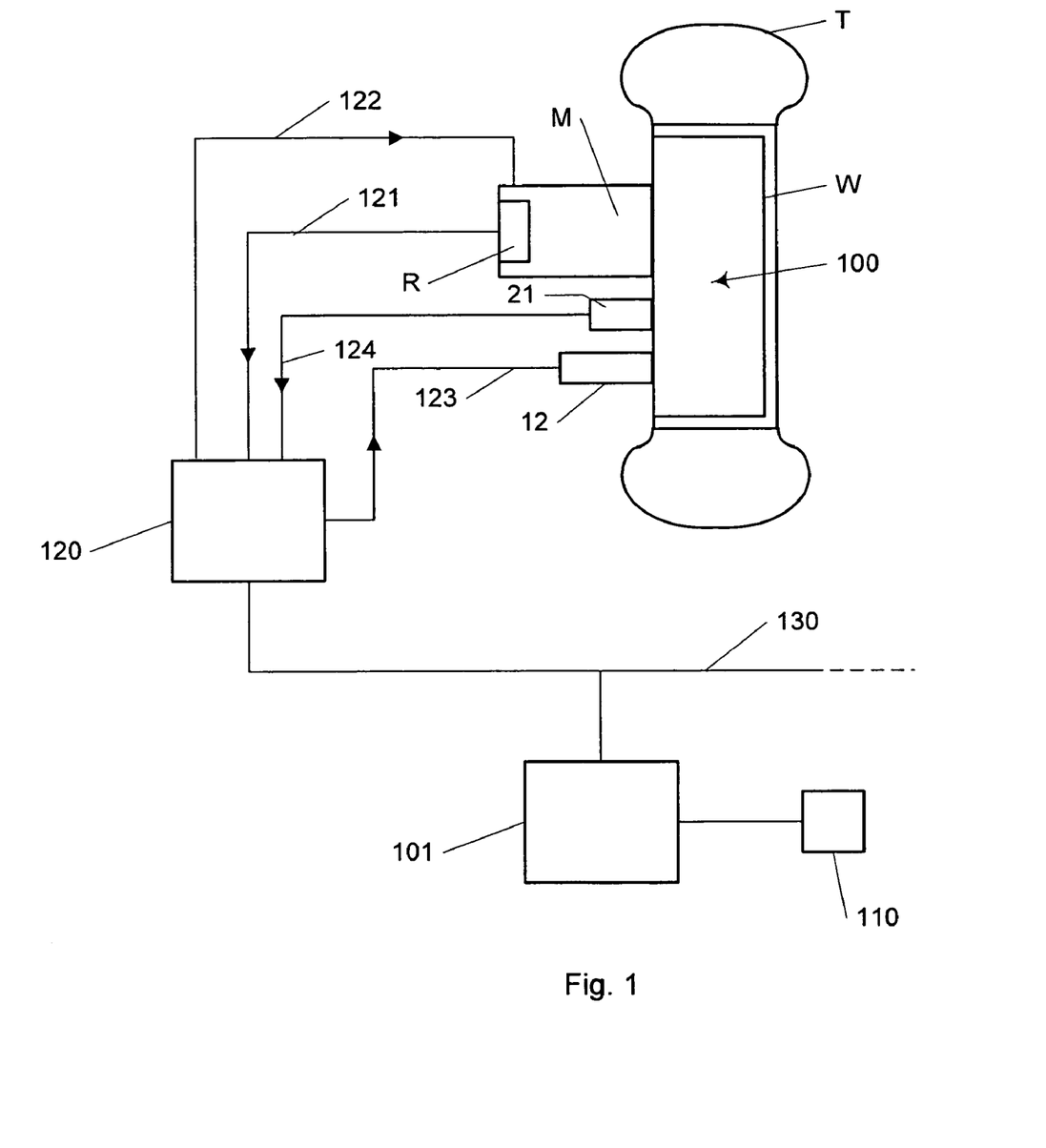
FIG. 1 shows a schematic view of an electric traction chain allowing the transmission of a motor torque to a driving wheel of a vehicle.

FIG. 1 is a schematic view of an electric traction chain. A wheel W can be seen, on which a tire T is mounted (or a non-pneumatic elastic band or any other suitable element). A gear change mechanism 100 having two reduction gears with a neutral position between gears is integrated on the wheel W. A specific example is given below by way of non-limiting example. An electric motor M can be seen, which is preferably of the permanent magnet synchronous type, equipped with an integrated rotor position sensor (a resolver R for example). An electronic assembly 120 controls the traction chain associated with the wheel W. The electronic assembly 120 is connected to the resolver R by a line 121. The resolver R supplies information about the position of the motor rotor, which makes it possible to calculate the revolution speed of said motor M by derivation with respect to time. The electronic assembly 120 is connected to a calculation unit 101 by a CAN® bus 130. The electronic assembly 120 is connected to each of the phases of the motor M by lines 122. The extension in "dashed" line of the CAN® bus 130 means that the calculation unit 101 may be connected to another electronic assembly 120 (not shown).

The gear change mechanism 100 comprises an actuator 12 which makes it possible to carry out the gear change. The actuator 12 is connected to the electronic assembly 120 by the line 123. The gear change mechanism 100 also comprises a position sensor 21 which makes it possible to identify the position of the actuator 12 among three possible positions: first gear corresponding to a "reduced position", dead point, second gear corresponding to a "direct drive". The electronic assembly 120 is connected to the position sensor 21 by the line 124.

The calculation unit 101 sends traction torque set values and gear change commands to the electronic assembly 120, allowing the electronic assembly 120 to inject the appropriate currents into the lines 122 and control the gear change mechanism 100, as will be explained in more detail below once the global architecture elements of the vehicle that are needed to implement the gear change method proposed by the invention have been described.

The vehicle may have two or four driving wheels. A schematic embodiment for a vehicle with 4 driving wheels can be seen in FIG. 2. The overall control of the traction of the vehicle is carried out by the calculation unit 101. It can be seen that there is an electronic assembly 120 for each of the two axles. Each electronic assembly 120 therefore controls two electric traction chains. Each traction chain comprises an electric traction motor M that is connected to the input shaft of the gear change mechanism 100 integrated on the corresponding wheel W. As a variant, there may be an electronic assembly 120 associated with each of the driving wheels.

Figure 2:
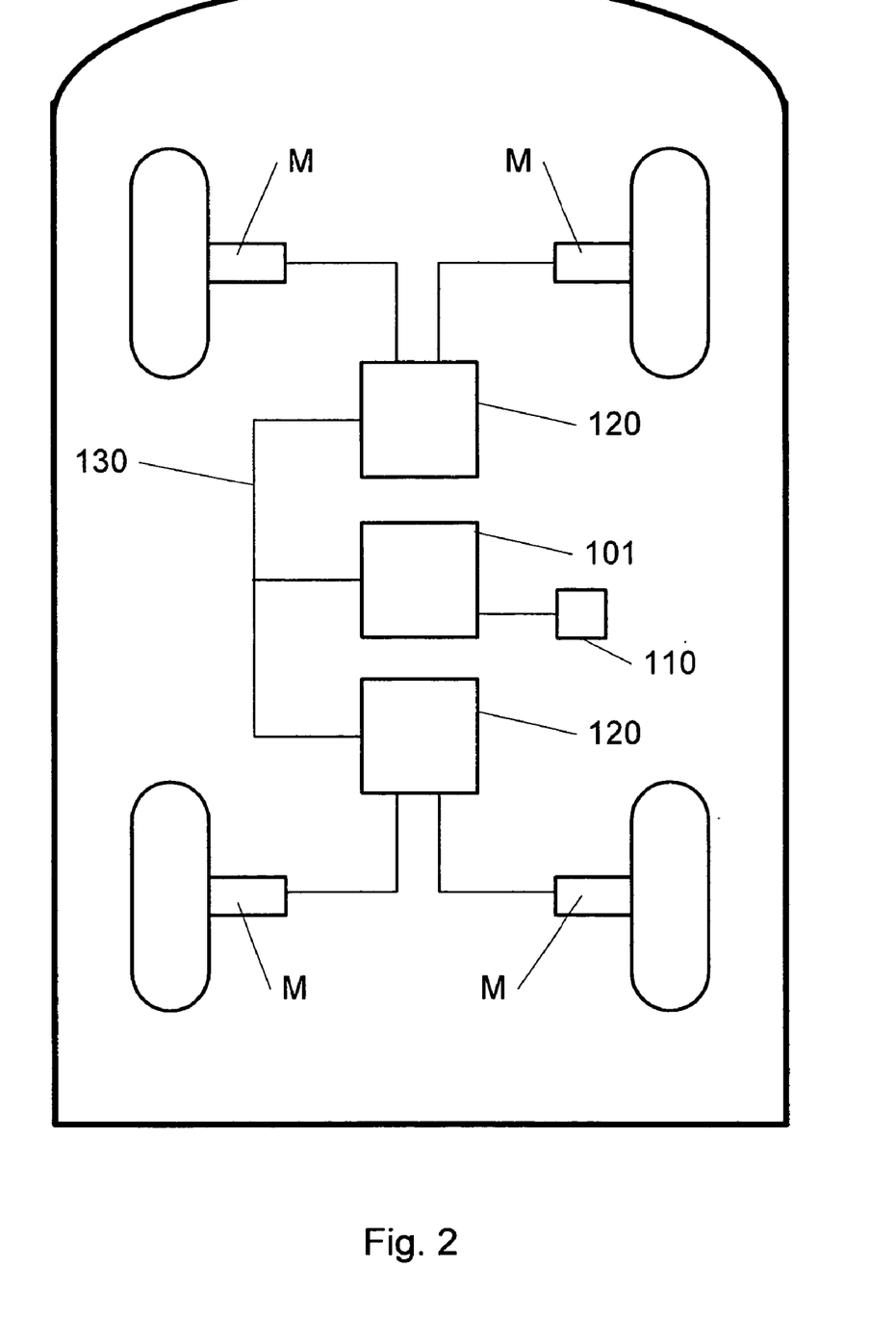
FIG. 2 shows an overall schematic view of a vehicle with 4 driving wheels, each equipped with an electric traction chain similar to that shown in FIG. 1.

The calculation unit 101 determines in particular, by means of any appropriate algorithm, within the skill of the person of the art and not part of this invention, the appropriate moment to carry out the gear change. The calculation unit 101 has at its disposition a certain number of information items coming:

from sensors 110 that give the accelerator pedal position, the brake pedal position or the required braking force, for example the pressure in the braking circuit, the position of the steering wheel, the engine gas throttle valve position and the speed of said engine (if the vehicle is of the series hybrid type equipped with an engine), from the electronic traction assemblies 120 associated with the driving wheels: speeds of the motors M, gears currently engaged; these information items are sent regularly (for example every 10 ms) via the CAN® bus 130 (or via a similar bus); the calculation unit 101 may then calculate the speed of each of the four wheels on the basis of these information items.

The actual gear change on an axle is controlled by the single electronic assembly 120 which controls the two electric traction motors of said axle and controls the gear change mechanism on the two wheels of the axle. In the case of two drive axles, there are therefore two electronic assemblies 120 which each control the elements of one axle. Each electronic assembly 120 receives a gear change command from the calculation unit 101 and sends a report to the latter after having carried out said command.

It is an object of the invention always to carry out the gear change operation by using only sensors used anyway to control the traction torque; the aim is therefore not to add a wheel speed sensor downstream of the gear change mechanism. While a gear is engaged, the speed of the wheel is given by the combination of the corresponding traction motor speed information item and the engaged gear information item. Unfortunately, the speed of the wheel is still useful in the phase where the gear change mechanism is at the dead point (neutral). During this phase, it is therefore not possible to know the speed of the wheel in question.

In the sequence of operations for changing the gear, it is provided, after passage to neutral, to readjust the revolution speed of the traction motor to a level that is compatible with the speed of the wheel when the traction chain uses the gear that it is planned to select (synchronization). This therefore involves knowing this speed of the wheel even during the gear change phase.

When a speed gear is engaged, the combined use of the following sensors makes it possible to know the speed to be reached:

the position sensor integrated on the permanent magnet synchronous electric motor, from which the motor speed is deduced by derivation of the position with respect to time, the position sensors on the gear change device (gearbox in direct drive or in the reduced position).

In the case of a vehicle with four driving wheels, it is possible to offset over time the gear changes on the two axles: firstly gear change on one axle and then gear change on the other axle. During the gear change on the first axle, the speed of the wheels affected by a gear change will be calculated by the calculation unit 101 on the basis of the traction motor speed information item and the information item regarding the current gear on the other axle, the wheel or wheels of said other axle then playing the role of wheels referred to as "sensor wheels" RC. The speeds of the wheels affected are transmitted from the electronic assembly 120 which controls said other axle, via the CAN® bus 130, to the electronic assembly 120 which controls the first axle comprising the wheels referred to as the "operated wheels" RM. The procedure is then repeated while swapping the axles for the roles of sensor wheels and operated wheels.

Figure 3:
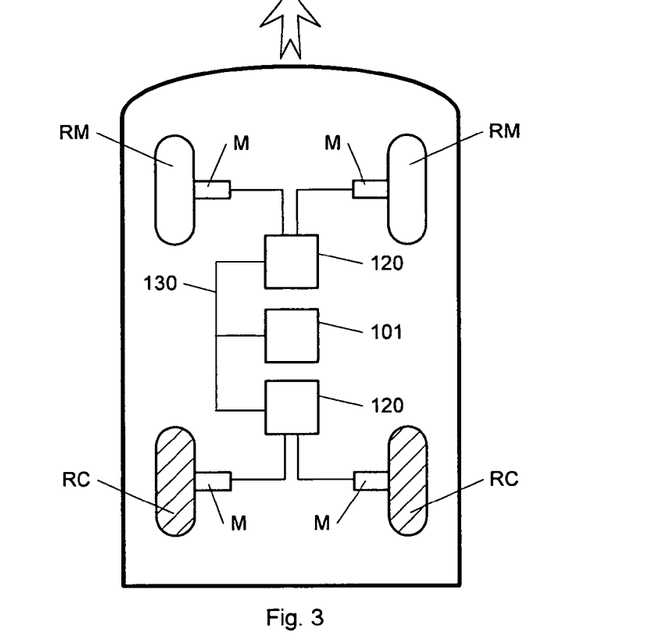
FIGS. 3 and 4 show two gear change phases in one particular embodiment of the invention for a vehicle with 4 driving wheels.
Figure 4:
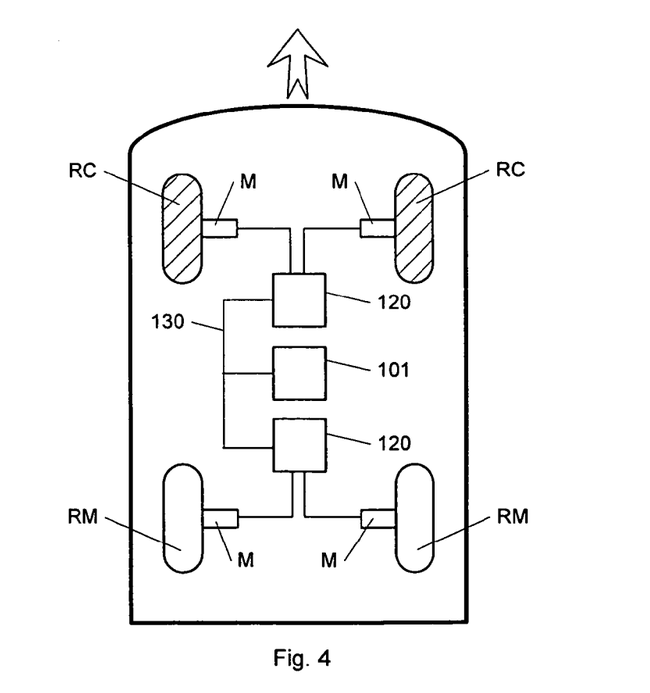

FIGS. 3 and 4 schematically show the two successive phases described above: firstly, for example, the gear change on the front wheels, the front wheels being the operated wheels RM and the rear wheels therefore being the sensor wheels RC (FIG. 3), and then the gear change on the rear wheels, the rear wheels being in this latter phase the operated wheels RM and the front wheels therefore being the sensor wheels RC (FIG. 4).

It is essential for this method to be based on a reliable information item regarding the speed to be reached. If, just before giving the gear change command or during the gear change, the calculation unit detects that one of the two sensor wheels RC is in an abnormal situation (blocking or slipping), the information item regarding the speed to be reached will be elaborated on the basis of the other wheel RC of the same axle. If the two wheels of the axle comprising the sensor wheels RC are in an abnormal situation (blocking or slipping) just before the gear change command is given, the gear change command will not be sent until they return to a normal situation. If the abnormal situation (blocking or slipping) on the two wheels of the axle comprising the sensor wheels RC arises while the gear change procedure is being carried out on the other axle, the calculation unit sends, as the "speed to be reached" information item, the last calculated information item that is deemed to be reliable. Another possible solution is as follows: remain in neutral on the wheels RM on which the gear change is being carried out until the speed given by the sensor wheel or wheels RC has become reliable once again.

For a vehicle with two driving wheels, it is possible to offset over time the gear changes on the two wheels: firstly gear change on the left wheel for example and then gear change on the right wheel. During the gear change on the left wheel (operated wheel RM), the speed to be reached will be calculated by the electronic assembly 120 on the basis of the traction motor speed information item and the information item regarding the current gear on the right wheel (sensor wheel RC), and vice versa.

Figure 5:
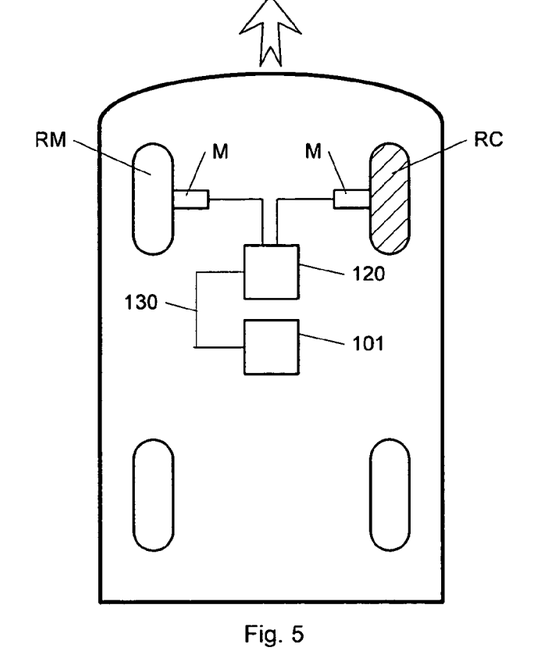
FIGS. 5 and 6 show two gear change phases in one particular embodiment of the invention for a vehicle with 2 driving wheels.
Figure 6:
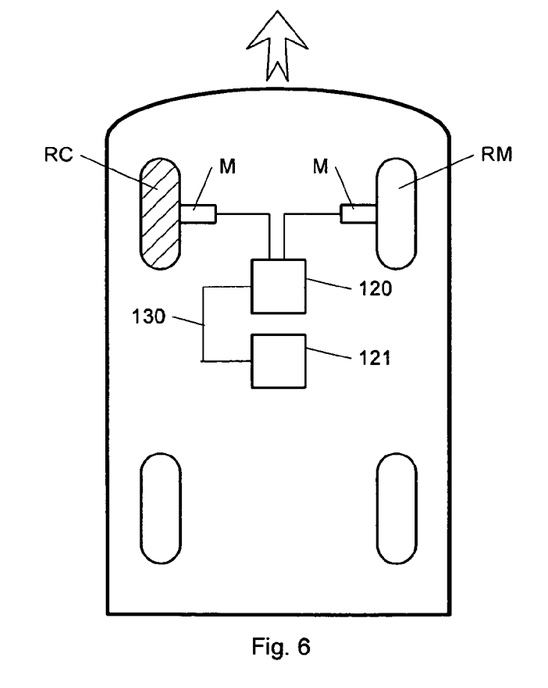

FIGS. 5 and 6 schematically show the 2 successive phases described above in the case of a vehicle where only the front wheels are driving wheels: firstly, for example, the gear change on the left front wheel, the left front wheel being the operated wheel RM and the right front wheel therefore being the sensor wheel RC (FIG. 5), then the gear change on the right front wheel, the right front wheel being the operated wheel RM and the left front wheel then being the sensor wheel RC (FIG. 6).

In an analogous manner to what has been stated above, if just before giving the gear change command the calculation unit detects that the sensor wheel RC is in an abnormal situation (blocking or slipping), the gear change command will not be sent until it returns to a normal situation. If the abnormal situation (blocking or slipping) on the sensor wheel RC arises while the gear change procedure is being carried out on the other wheel RM, the last calculated information item that is deemed to be reliable is used as the information item regarding the speed to be reached. Here again, another possible solution is as follows: remain in neutral on the wheel RM on which the gear change is being carried out until the speed to be reached given by the sensor wheel RC has become reliable once again.

In all cases, if a wheel is blocked (very violent braking) as it is undergoing a gear change, and more particularly when the gearbox is in neutral, the corresponding wheel and traction motor speeds are no longer compatible to allow the new gear to be engaged. This situation cannot be detected since the wheel is mechanically decoupled from the motor. To avoid any risk of mechanical breakage in the device, it is desired to prohibit the gear change procedure in the event of very violent braking, which is itself detected via the braking pressure or via an electronic signal from an electronic supervisor of the vehicle or via a longitudinal acceleration measurement.

The remainder of the text describes in more detail one particular example of a gear change mechanism 100.

Figure 7:
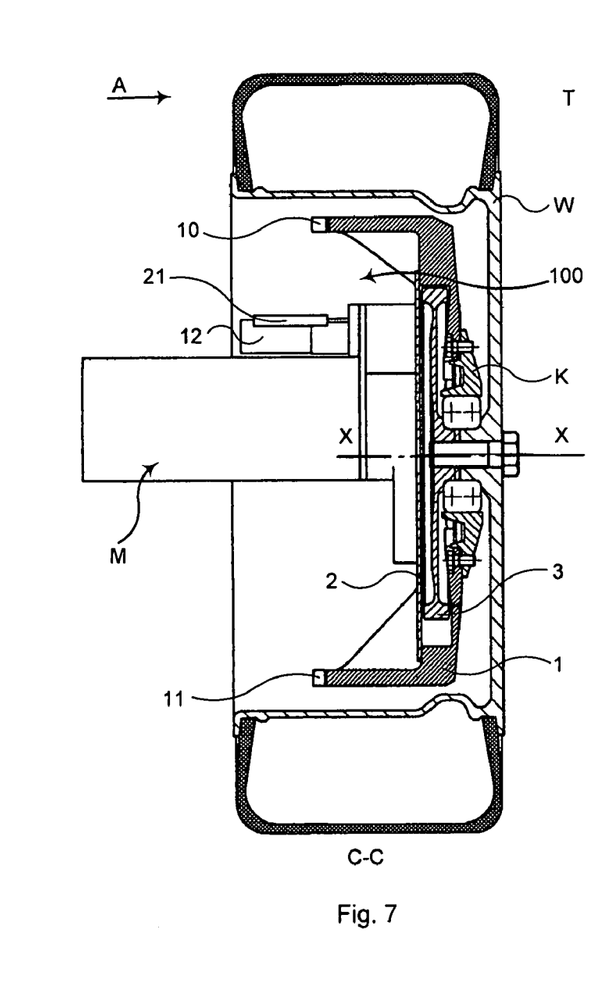
FIG. 7 shows a detailed example of a vehicle wheel in which an electric traction chain is integrated, seen in section along C/C indicated in FIG. 8.
Figure 8:
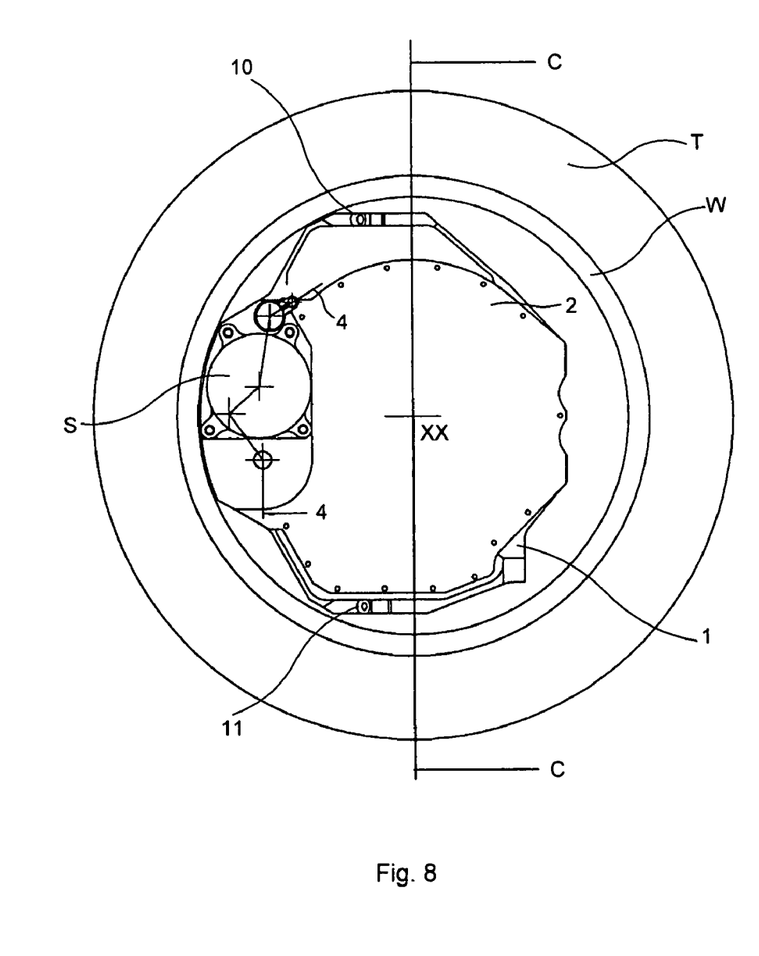
FIG. 8 is a view along A of FIG. 7.

The wheel W on which a tire T is mounted can be seen in FIGS. 7 and 8. The wheel is mounted such that it can rotate on a wheel carrier K, the axis XX being its axis of rotation. Most of the elements of the gear change mechanism 100 are contained in a casing 1 which is closed by a cover 2 and by the stator part S of an electric traction motor M. The casing 1 comprises an upper extension 10 and a lower extension 11, to the ends of which there may be attached a suspension system for the suspension of the wheel W with respect to a chassis or to the body of the vehicle. Only the "non-suspended" elements of a connection to the ground for a motor vehicle are shown here.

Figure 9A:
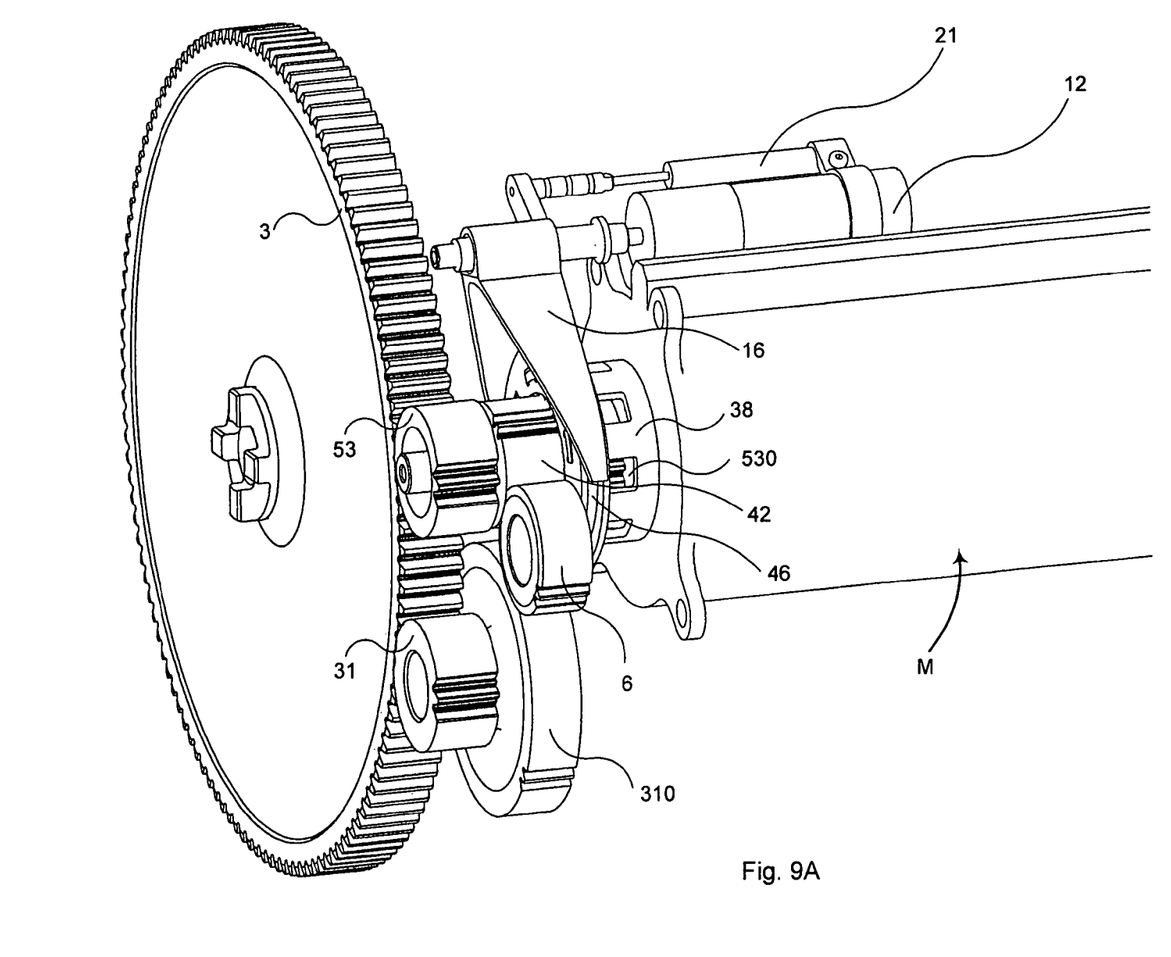
FIGS. 9A, 9B and 9C are partial perspective views showing the electromechanical transmission chain.

The casing 1 delimits a closed space with the cover 2 and the electric motor M. This closed space may contain the amount of oil needed to lubricate the mechanical elements installed therein. Inside the casing 1 there can be seen a gearwheel 3 (see FIG. 7 and FIG. 9) which can rotate about the axis XX, in direct engagement with the wheel W.

Figure 10A:
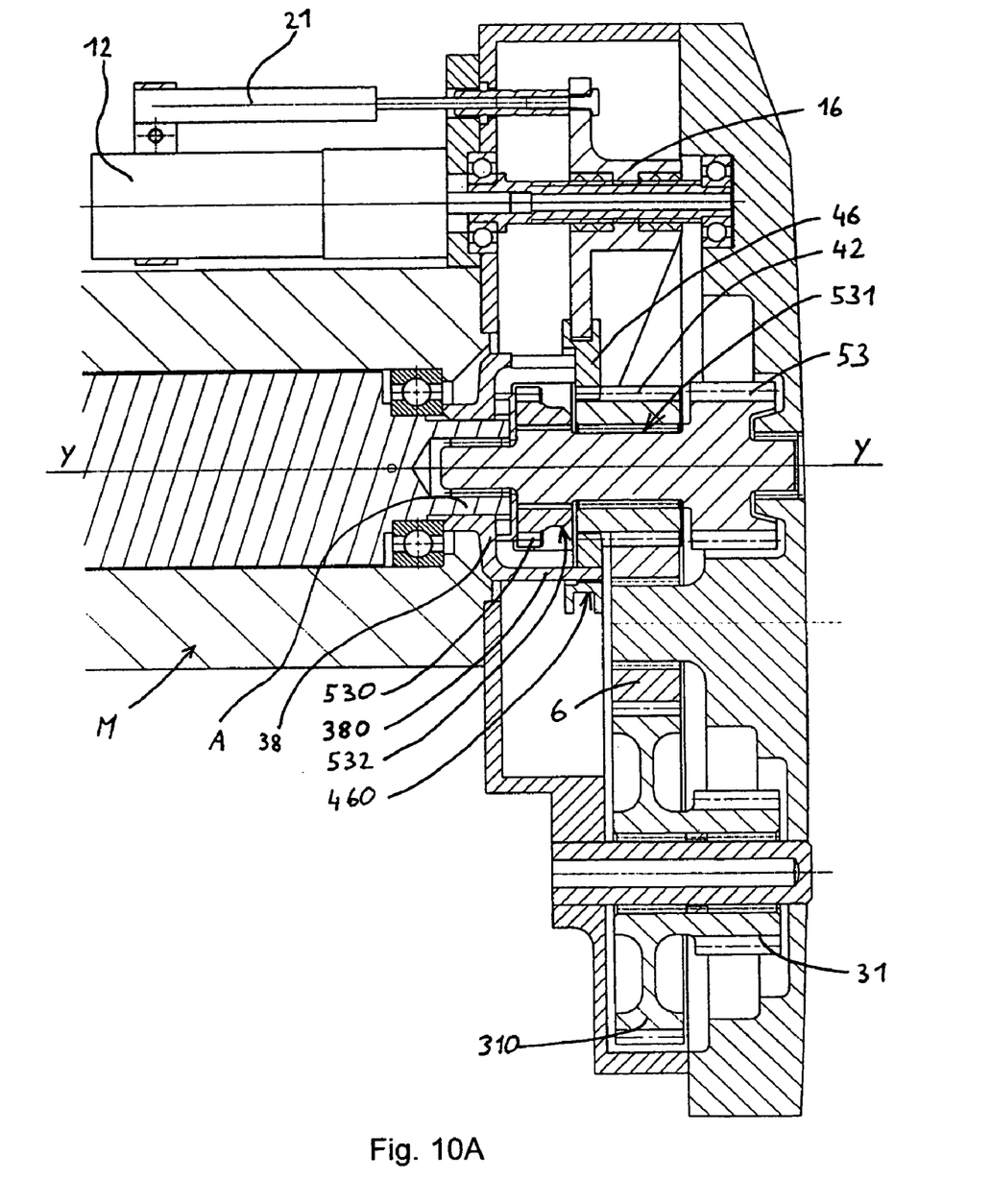
FIGS. 10A, 10B and 10C are sections along 4/4 of FIG. 8, showing the essential elements of the gear change mechanism having two gears.

In FIG. 9A, it can be seen that the gearwheel 3 is meshed with a primary pinion 31. The primary pinion 31 is coaxial with and secured to an auxiliary pinion 310 having a diameter that is larger than the diameter of the primary pinion 31. The primary pinion 31 and the auxiliary pinion 310 form one and the same one-piece mechanical part which can rotate (see FIG. 10A). The auxiliary pinion 310 is meshed on an intermediate pinion 6. The pinion 6 makes it possible to maintain the same direction of revolution of the electric motor regardless of the gear engaged.

Moreover, the gearwheel 3 is meshed with a secondary pinion 53. The secondary pinion 53 is coaxial with and secured to an interlockable pinion 530 (see in particular FIG. 9A and FIG. 10A). The secondary pinion 53 and the interlockable pinion 530 form a one-piece mechanical part which can rotate. This mechanical part comprises a peripheral clearance 532 with no toothing, adjoining the interlockable pinion 530 (see in particular FIG. 10A). This mechanical part also comprises a smooth intermediate section 531. An interlockable idler pinion 42 is mounted on the smooth intermediate section 531, coaxially with respect to the secondary pinion 53, so as to be able to rotate freely with respect to the secondary pinion 53.

Figure 9B:
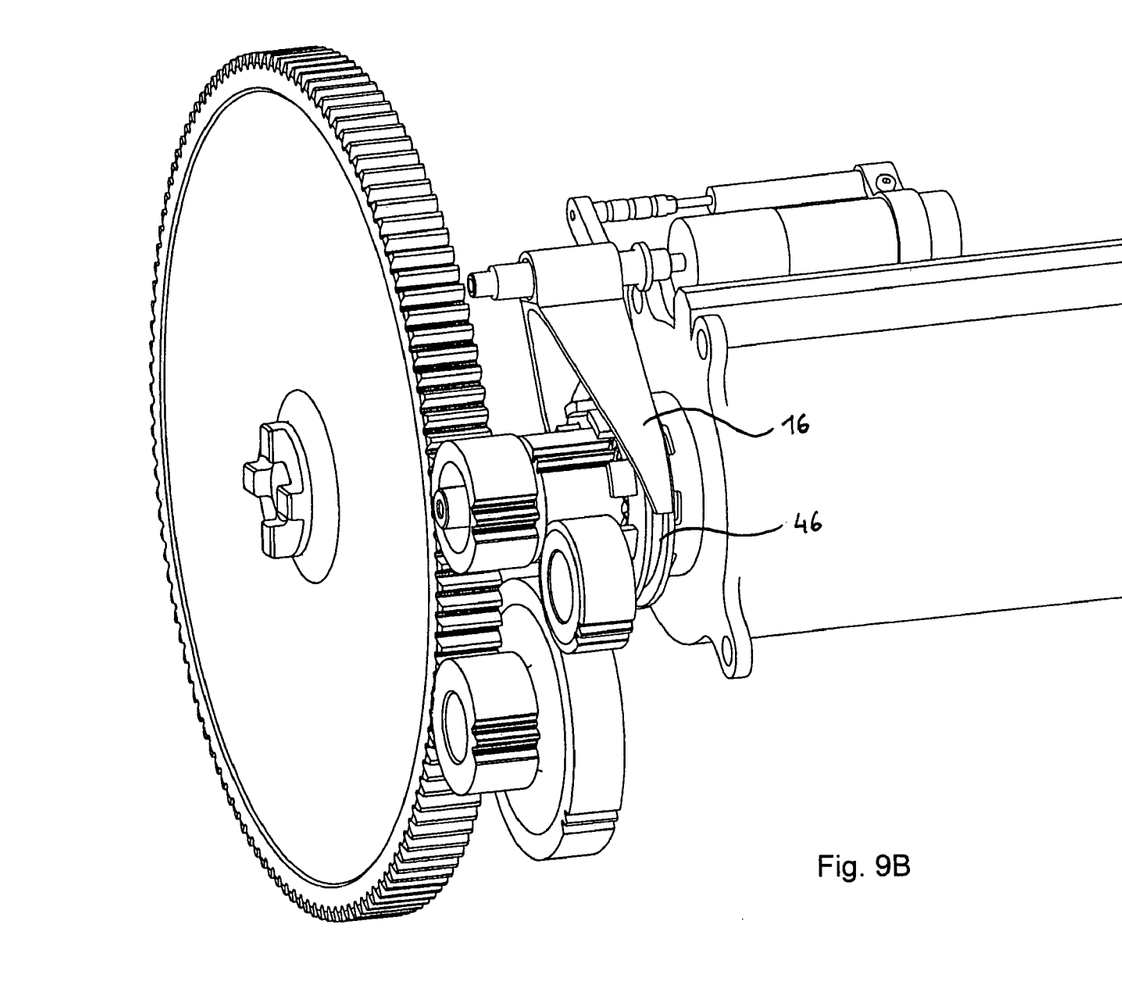
Figure 9C:
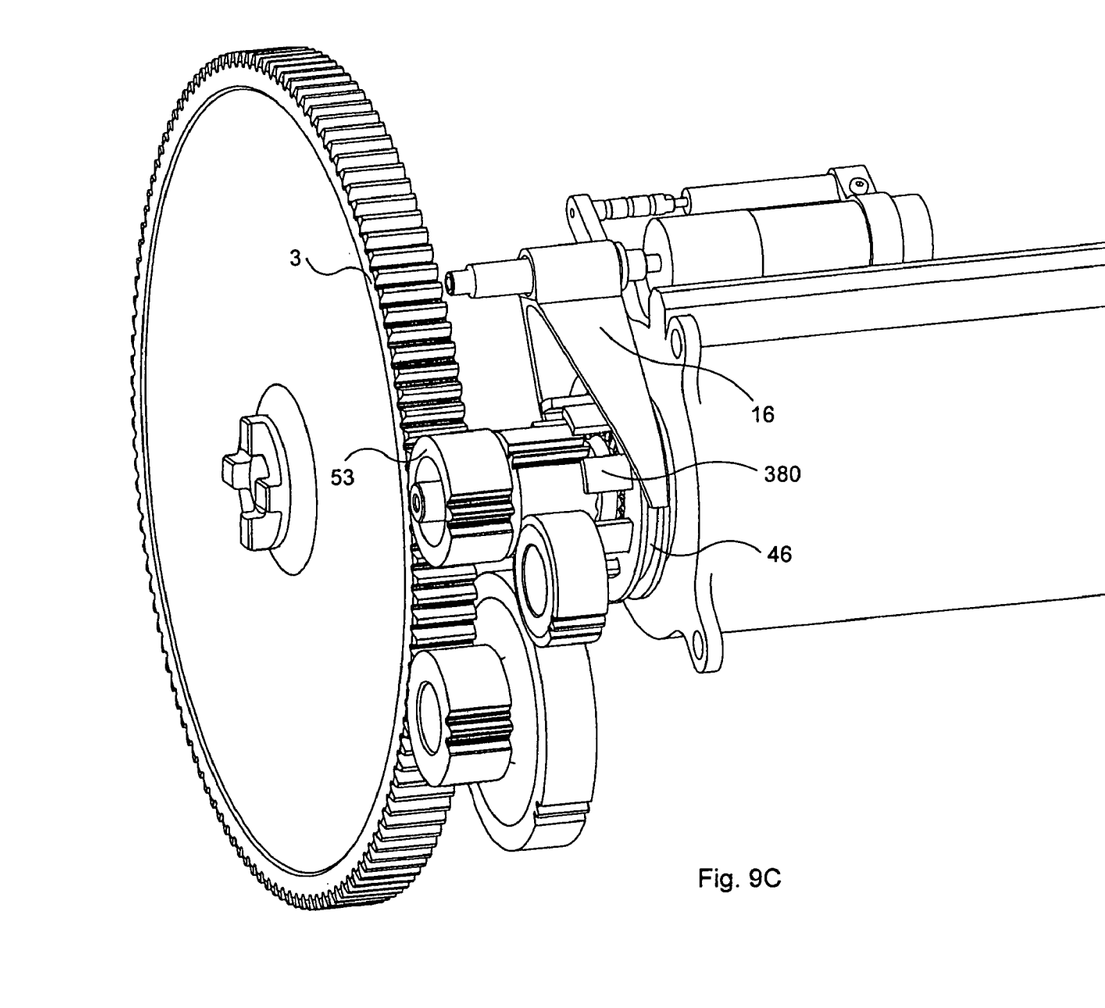
Figure 10B:
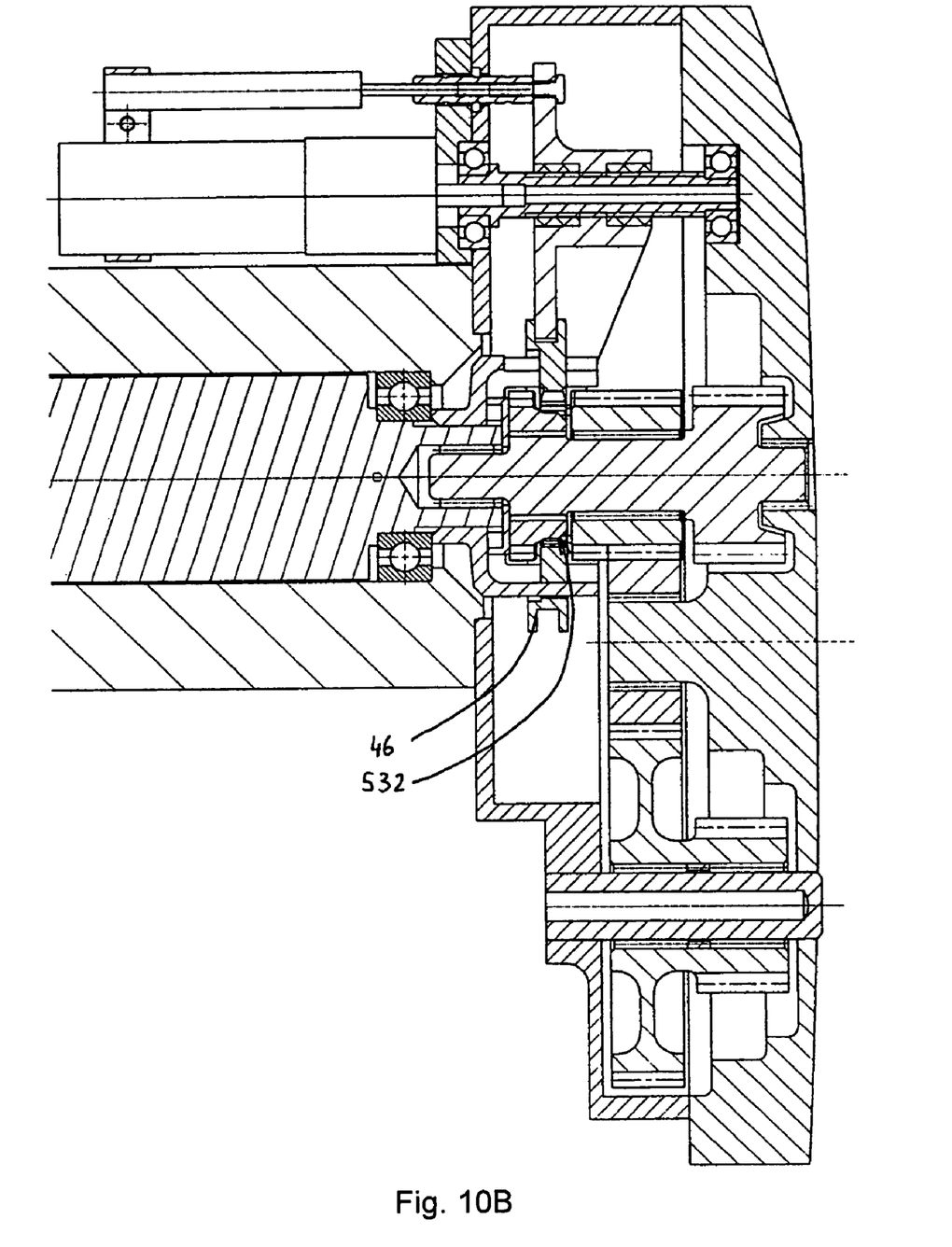
Figure 10C:
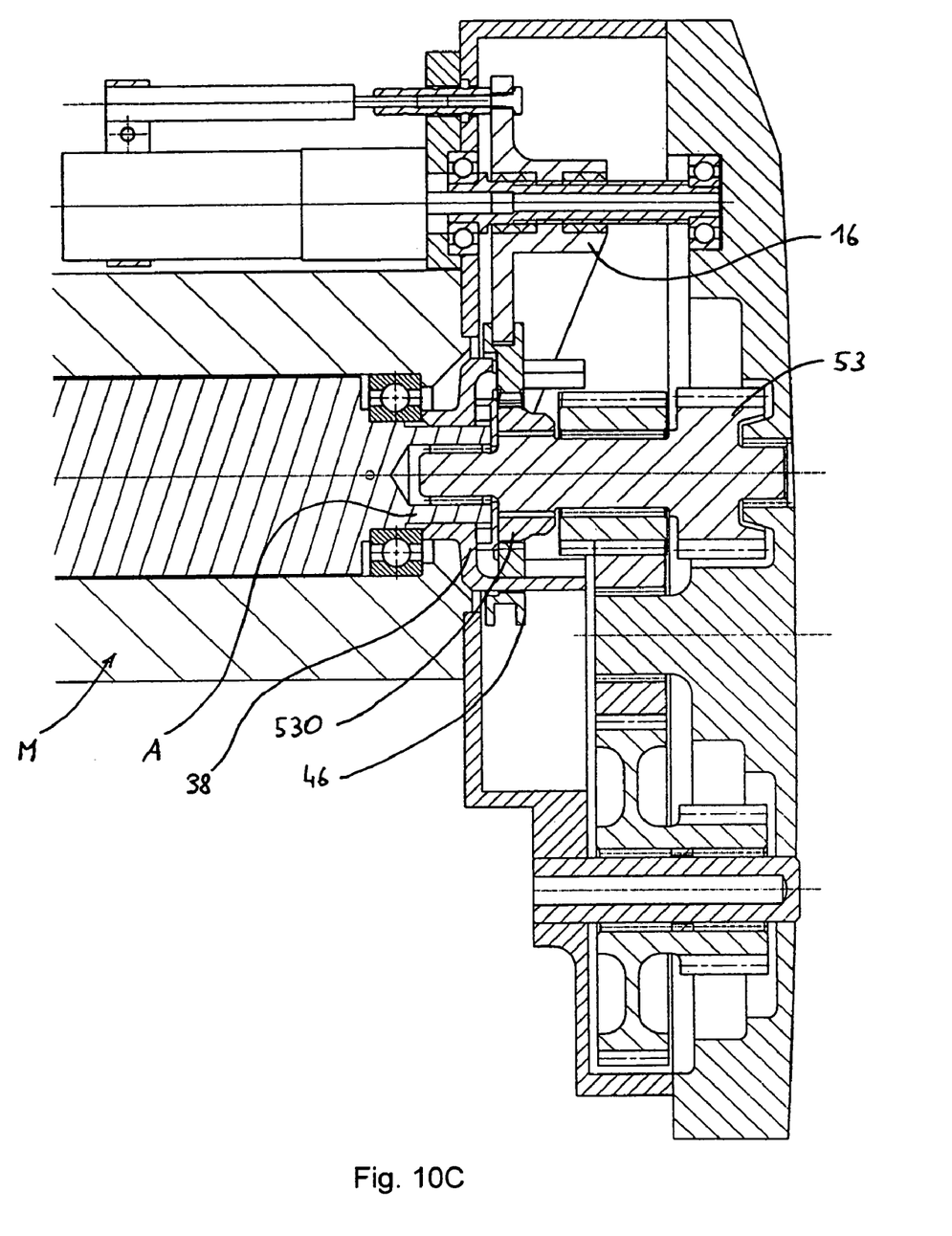

The gear change mechanism 100 comprises a dog 46 which makes it possible to select a gear. In the embodiment shown, the dog 46 comprises an inner toothing identical to the (outer) toothing of the interlockable pinion 530 and of the interlockable idler pinion 42. The dog 46 may be interlocked either to the interlockable idler pinion 42 so as to bring about a reduction (FIGS. 9A and 10A), or to the interlockable pinion 530 so as to drive in direct drive mode (FIGS. 9C and 10C), or else the dog 46 may be brought into a non-interlocked position in which its inner toothing is facing the clearance 532 which is free of any toothing (FIGS. 9B and 10B).

Figure 11:
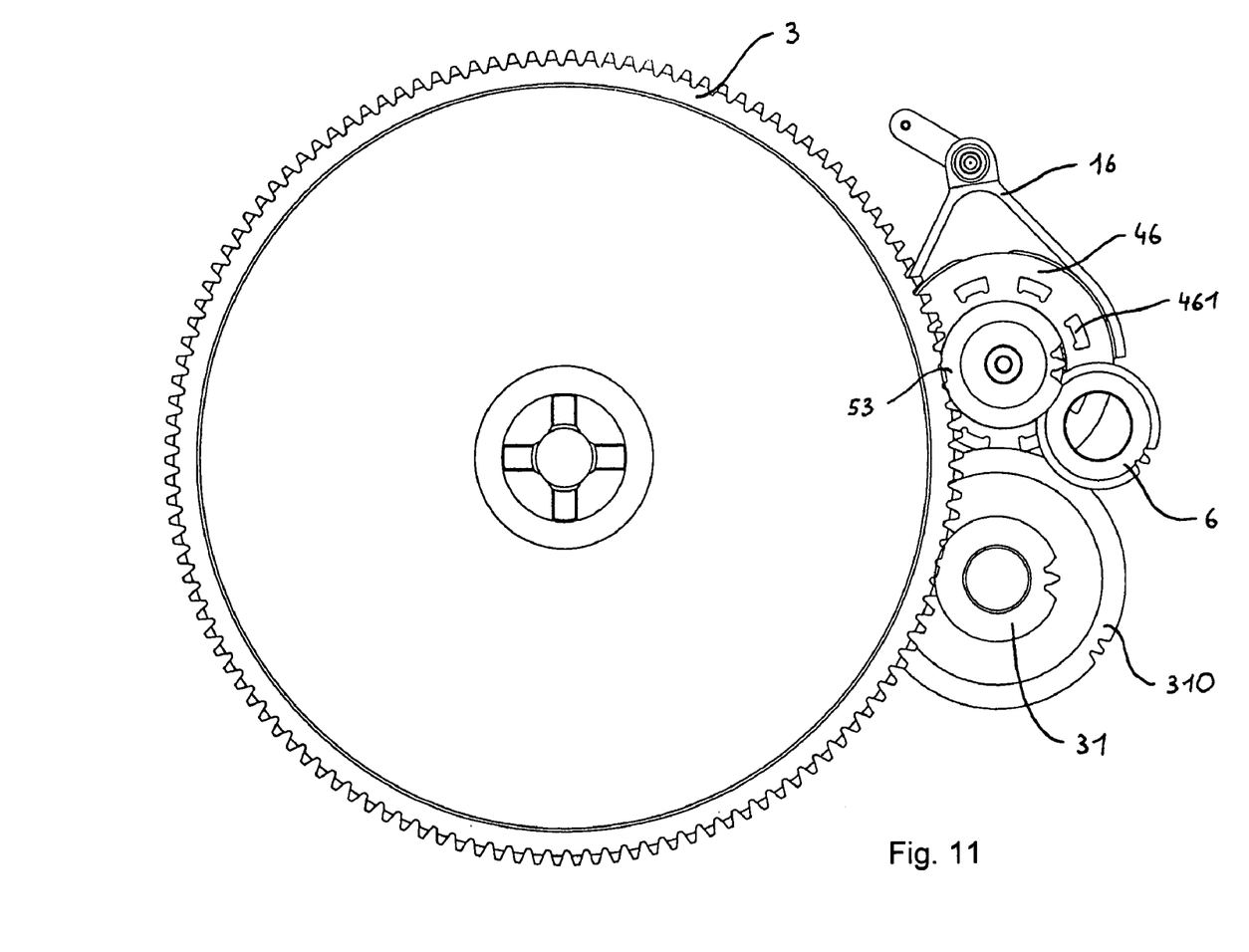
FIG. 11 is a partial view of the electromechanical transmission chain.

Moreover, the dog 46 comprises an outer peripheral groove 460 (see FIG. 10A) and cutouts 461 (see FIG. 11). A shaft end A (FIGS. 10) of the rotor of the electric motor M can be seen, the axis YY being the axis of rotation of the shaft A. A bell-housing 38 is secured to the shaft A of the rotor of the electric motor M. The dog 46 is centered by the bell-housing 38. A fork 16 is engaged radially from the outside in the peripheral groove 460 on the dog 46. The bell-housing 38 comprises fingers 380 that are engaged in the cutouts 461 of the dog 46. The dog 46 can slide axially with respect to the bell-housing, while being secured in rotation with the latter.

The fork 16 is controlled by a geared motor 12. A position sensor 21 is connected to the fork 16. The dog 46 may assume three positions:
  a position in which the dog 46 drives the gearwheel via an intermediate pinion 6 which makes it possible to reverse the speed of revolution; the dog 46 is then interlocked with the idler pinion 42, and hence in engagement with the primary pinion 31, via the intermediate 6 and auxiliary 310 pinions (see in particular FIGS. 9A and 10A);
  a position in which it is interlocked with the auxiliary pinion 530, and hence in engagement with the secondary pinion 53 (see in particular FIGS. 9C and 10C),
  a neutral intermediate position, which can be seen in FIGS. 9B and 10B.

The primary pinion 31 and the secondary pinion 53 are continuously driven by the gearwheel 3. Having identical toothing, they both turn at the same angular velocity. The secondary pinion 53, when it is in engagement with the shaft A of the rotor of the electric motor M via the second auxiliary pinion 530, the dog 46 and the bell-housing 38, is in direct engagement with the motor M. On the other hand, when the traction torque passes to the primary pinion 31, via the bell-housing 38, the dog 46, the idler pinion 42, the intermediate pinion 6 and the auxiliary pinion 310, between the shaft A of the rotor of the electric motor M and the primary pinion 31 there is a reducing gear corresponding to the ratio R between the number of teeth of the auxiliary pinion 310 and the number of teeth of the idler pinion 42.

It should also be noted that the dog drives the gearwheel 3 via an intermediate pinion 6 which makes it possible to reverse the revolution speed. The pinion 6 thus makes it possible to maintain the same direction of revolution of the electric motor regardless of the gear engaged: direct drive or other gear. As a variant (not shown in the figures), it is also possible to control the electric motor in opposite directions of revolution for one gear and for the other gear.

Figure 12:
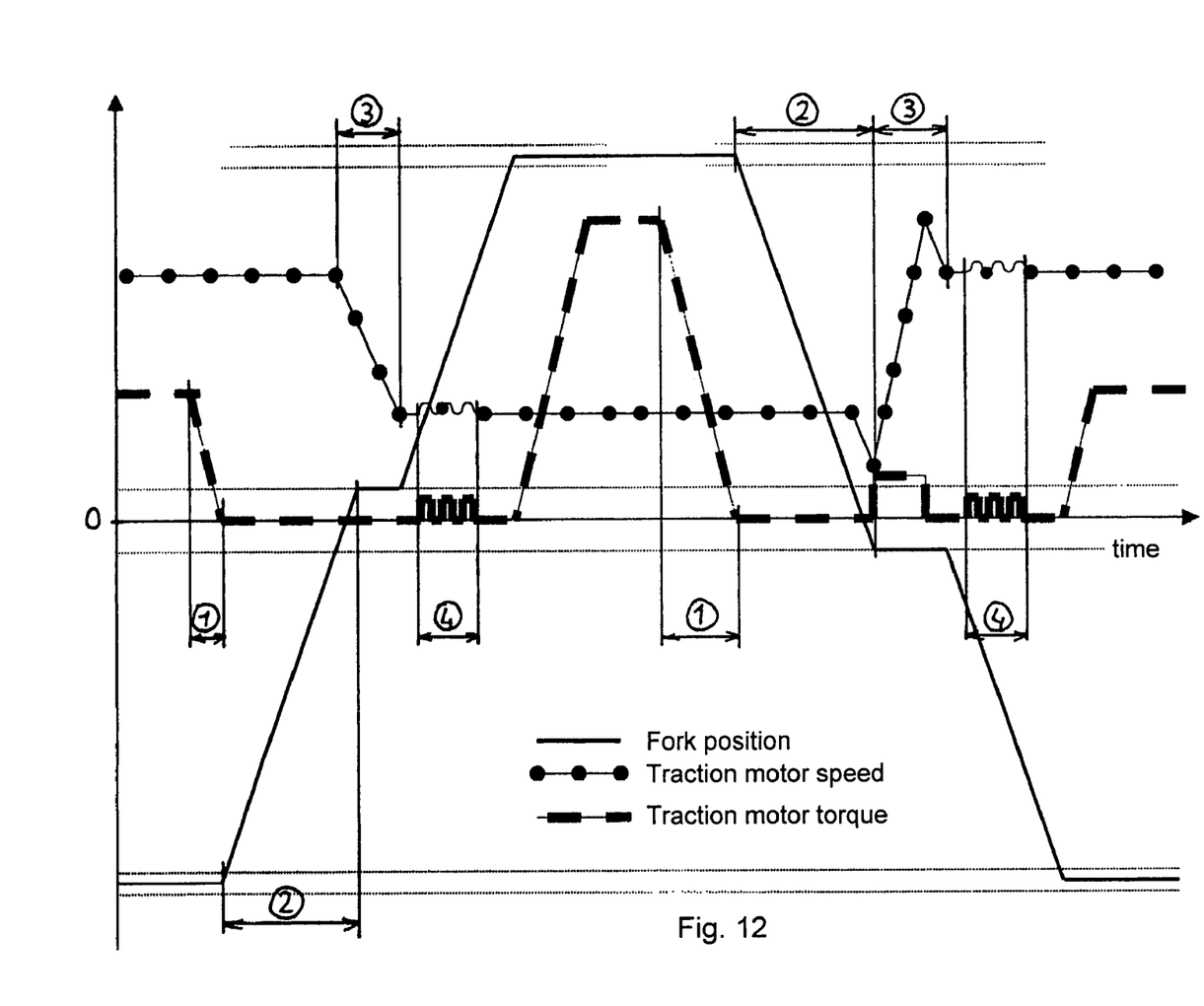
FIG. 12 is a timing diagram showing the evolution over time during the gear changes of the position of the control fork, of the speed of the traction motor and of the torque of the traction motor.

The timing diagram shown in FIG. 12 illustrates the sequence of operations. Regardless of the direction of the gear change and regardless of the gear passage concerned, a gear change involves canceling the motor torque (zone 1), bringing the gearbox to the neutral position (zone 2), and then involves adjusting the revolution speed of the motor to the level corresponding to the future gear selected (zone 3), so as to be able to mechanically engage said gear, before once again controlling the motor to the desired torque.

The electronic assembly 120 controls the following operations, in order for example to pass from first gear to second gear:

Control of first gear engaged on operated wheel,
Calculation of the speed of the wheel on the basis of the "traction motor speed" of the sensor wheel and the gear engaged on the sensor wheel,
Motor torque brought to zero,
Passage to neutral,
Readjustment of motor speed, on the basis of the speed of the wheel calculated above,
Engagement of second gear,
Control of engaged second gear,
Reestablishment of motor torque.

The timing diagram of FIG. 12 also shows some preferred details of embodiments which are shown by way of non-limiting example. In order to facilitate changing gear, it is possible to cause, by judicial control of the electric motor torque, small speed oscillations (zone 4) which serve to promote the engagement of the dogs during engagement of the next gear. It should be noted that the torque variations and speed variations involved are very small: the torque variation shown in zone 4 serves only to accelerate the rotor of the motor M against its own inertia; the speed variation resulting therefrom is itself very small, all the more so since it is immediately limited by the start of engagement of the dog (taking up of functional clearances). There is no need to attempt to compare the torque and speed variations shown in zone 4 with the torque and speed variations shown in the other zones since the drawing is purely schematic.

Preferably, and if the driving conditions so allow, it is advantageous to control the torque of the electric traction motors so that, just prior to disengaging a gear and just after having engaged another gear, the torque on the wheel is largely equivalent. If a move is made towards greater total reduction (passing from second gear to first gear), this means that it is necessary to voluntarily limit the torque of the electric motor just after the speed change maneuver. The reduction in torque is largely carried out in the ratio R. If a move is made towards smaller total reduction (passing from first gear to second gear), this means that it is necessary to voluntarily increase the electric torque just after the speed change maneuver. The increase in torque is largely carried out in the ratio R. The torque available to the motor is necessarily limited to a value Cmax. If the planned increase in torque leads to a value greater than Cmax, it is advantageous, before the speed change maneuver, to reduce the torque to a value smaller than or equal to Cmax/R, so that after the speed change maneuver the torque applied does not exceed the value Cmax.

It should also be noted that, when changing gear to a gear of lesser total reduction, the electric motor has to pass as quickly as possible to a lower speed as soon as the gearbox is in the neutral position. It is therefore necessary to electrically brake the motor, which involves being capable of absorbing the electrical energy (for example dissipation into the resistors or recharging the storage element).

In summary, the invention proposes a method of controlling the gear change for a vehicle having at least two driving wheels, each equipped with a traction chain as described above, in which the gear changes on the two driving wheels are offset over time: in an initial phase, gear change on a wheel RM referred to as the "operated" wheel, the speed to be reached being calculated by the electronic assembly 120 on the basis of the traction motor speed information item and the information item regarding the current gear on the other wheel RC referred to as the "sensor wheel", then, in a successive phase, gear change on said other wheel. For a vehicle having at least four driving wheels in two axles, at least one sensor wheel RC is located on one of the axles, the operated wheels RM being on the other axle during the initial phase, and the locations of the "sensor" wheels RC and "operated" wheels RM are reversed in the successive phase.

It should be emphasized that the application of the method proposed by the invention is in no way limited to a gear change mechanism of the type described above. It may also be used, for example, with an epicycloidal gearbox in which a first gear is obtained by braking a brake band, a second gear is obtained by braking another brake band, and a neutral position is obtained by braking neither of the brake bands mentioned above, an example of which is given in U.S. Pat. No. 2,939,344.

The invention claimed is:

1. Method of controlling the gear change for a vehicle having at least first and second driving wheels, each equipped with a traction chain comprising an electric motor M which drives an input shaft, a gear change mechanism having at least two reduction gears with a neutral position between gears, in which the gear change on the first and second driving wheels is carried out by offsetting over time the gear changes on the first and second driving wheels in accordance with the following sequence of steps:

A) in an initial phase:
  A1) releasing the current gear on the first driving wheel and stopping it in the neutral position,
  A2) changing the revolution speed of the motor so as to synchronize it as a function of the reduction of the gear to be engaged on the first driving wheel, using as an estimate of the speed-to-be-reached a speed information item obtained from the second driving wheel, and
  A3) engaging the intended gear on said first driving wheel; and then
B) in a successive phase, changing the gear on said second driving wheel.

2. The gear change control method as claimed in claim 1, wherein step B comprises:
  B1) releasing the current gear on the second driving wheel and stopping it in the neutral position, B2) changing the revolution speed of the motor so as to synchronize it as a function of the reduction of the gear to be engaged on the second driving wheel, using as an estimate of the speed-to-be-reached a speed information item obtained from the first driving wheel, and B3) engaging the intended gear on said second driving wheel.

3. The method as claimed in claim 2, wherein in response to a blocking or slipping of the first driving wheel being detected during step B2, the last calculated information item that is deemed reliable is used as the speed-to-be-reached information item in step B2.

4. The method as claimed in claim 2, wherein in response to a blocking or slipping of the first driving wheel being detected during step B2, the second driving wheel is maintained in a neutral condition until the speed of the first driving wheel becomes reliable once again.

5. The gear change control method as claimed in claim 1 for a traction chain using, as electric traction motors, brush less permanent magnet synchronous motors comprising an integrated rotor position sensor.

6. The gear change control method as claimed in claim 5, in which the speed to be reached is calculated on the basis of signals relating to a driving wheel, at least one signal coming from the integrated sensor on the rotor and at least one other signal being representative of the current reduction gear on such driving wheel.

7. The gear change control method as claimed in claim 1, for a vehicle having at least four driving wheels on two axles, wherein each axle carries two of the driving wheels, with the first and second driving wheels being disposed on the first and second axles, respectively.

8. The method as claimed in claim 7, wherein in response to a blocking or slipping of one of the two driving wheels on the second axle being detected during step A2, the other of those two wheels constituting the second driving wheel.

9. The method as claimed in claim 7, wherein in response to a blocking or slipping of both driving wheels on the second axle being detected during step A2, the last calculated information item that is deemed reliable is used as the speed-to-be-reached information item.

10. The method as claims in claim 7, wherein in response to a blocking or slipping of both driving wheels on the second axle being detected during step A1, the first driving wheel is maintained in a neutral condition until at least one of the driving wheels on the second axle becomes reliable once again.

11. The method as claimed in claim 1, in which the gear change procedure is prohibited in the event of braking above a predetermined threshold.

12. The method as claimed in claim 1, wherein in response to a blocking or slipping of the second driving wheel being detected during step A2, the last calculated information item that is deemed reliable is used as the speed-to-be-reached information item in step A2.

13. The method as claimed in claim 1, wherein in response to a blocking or slipping of the second driving wheel being detected during step A2, the first driving wheel is maintained in a neutral condition until the speed of the second driving wheel becomes reliable once again.

* * * * *